United States Patent [19]

Fisher et al.

[11] Patent Number: 5,321,754

[45] Date of Patent: Jun. 14, 1994

[54] SEQUENCE SYNCHRONIZATION

[75] Inventors: David A. Fisher, Walden; Simon D. Brueckheimer, London, both of United Kingdom

[73] Assignee: Northern Telecom Limited, Montreal, Canada

[21] Appl. No.: 969,185

[22] PCT Filed: Sep. 19, 1991

[86] PCT No.: PCT/GB91/01610
§ 371 Date: Feb. 2, 1993
§ 102(e) Date: Feb. 2, 1993

[87] PCT Pub. No.: WO92/05647
PCT Pub. Date: Apr. 2, 1992

[30] Foreign Application Priority Data

Sep. 19, 1990 [GB] United Kingdom ............... 9020410

[51] Int. Cl.$^5$ ..................... H04L 9/26; H04L 7/10
[52] U.S. Cl. ............................... 380/48; 380/46; 375/115; 371/47.1
[58] Field of Search ............. 380/48, 46; 375/115, 375/1; 371/47.1

[56] References Cited

U.S. PATENT DOCUMENTS

| | | |
|---|---|---|
| 3,873,920 | 3/1975 | Apple, Jr. et al. |
| 4,383,322 | 5/1983 | Halpern et al. |
| 4,689,606 | 8/1987 | Sato ............................ 380/46 X |
| 4,719,643 | 1/1988 | Beeman ........................ 375/115 |
| 4,754,482 | 6/1988 | Weiss ........................... 380/48 |
| 4,771,463 | 9/1988 | Beeman . |
| 4,893,339 | 1/1990 | Bright et al. ................. 380/43 X |
| 5,007,088 | 4/1991 | Ooi et al. ..................... 380/46 |
| 5,007,794 | 12/1991 | Taylor ......................... 380/48 |
| 5,237,593 | 8/1993 | Fisher et al. .................. 380/44 X |

FOREIGN PATENT DOCUMENTS 0370291  5/1990  European Pat. Off. .
2597687 10/1987  France .

Primary Examiner—Gilberto Barrón, Jr.
Attorney, Agent, or Firm—Lee, Mann, Smith, McWilliams, Sweeney & Ohlson

[57] ABSTRACT

A data sequence is transmitted from a transmitter to a receiver, being scrambled at the transmitter by adding a pseudo random sequence (PRS) thereto. At the receiver the received data is unscrambled by subtraction of the same PRS. The receiver PRS generator is synchronised to the transmitter PRS generator by means of samples conveyed from the transmitter to the receiver. The transmitter includes a PRS sample mapping block, the receiver includes a functionally complementary sample mapping block and the time of transmission of the conveyed samples is decoupled from the points in the PRS for which they were selected, the conveyed samples being skewed with respect to the PRS.

14 Claims, 6 Drawing Sheets

TRANSMITTER SCRAMBLING METHOD

STORES SELECTED PRS SAMPLES (FIG 2, ROW 3) AND MAPS THEM ONTO CRC POSITIONS AS CONVEYED CHANNEL SAMPLES (FIG 2, ROW 4)

SEQUENCE SYNCHRONIZATION

This invention relates to methods of pseudo random sequence generation and apparatus for use therein and comprises extensions of the methods and apparatus described in our U.S. Pat. No. 5,237,593 the contents of which are incorporated herein by reference.

In U.S. Pat. No. 5,237,593 there is described a method for scrambling a data sequence by the modulo addition at the transmitter of a pseudo random sequence, descrambling being achieved by the modulo subtraction at the receiver of the same pseudo random sequence, the receiver PRS generator being synchronised to that in the transmitter by means of conveying samples over the same transmission channel as the data from the transmitter PRS to a synchronisation mechanism in the receiver PRS.

According to one aspect of the present invention there is provided an apparatus for transmitting a data sequence from a transmitter to a receiver, including means at the transmitter for scrambling the data sequence by modulo addition thereto of a pseudo random sequence (PRS) output from a PRS generator at the transmitter, and means at the receiver for unscrambling the received scrambled data sequence by modulo subtraction therefrom of the same PRS, the PRS at the receiver being generated by a respective PRS generator thereat, the receiver PRS generator being synchronised to the transmitter PRS generator by means of samples taken from the transmitter PRS and conveyed to synchronisation means at the receiver, and wherein the transmitter includes a PRS sample mapping block and the receiver includes a functionally complementary sample mapping block and the time of transmission of the conveyed samples is decoupled from the points in the PRS for which they were selected, the conveyed samples being skewed with respect to the PRS, thereby to optimise the performance of the apparatus.

According to another aspect of the present invention there is provided a method of transmitting a data sequence from a transmitter to a receiver including the steps of scrambling the data sequence by modulo addition thereto of a pseudo random sequence (PRS) output from a PRS generator at the transmitter, and unscrambling the received scrambled data sequence at the receiver by modulo subtraction therefrom of the same PRS, the PRS at the receiver being generated by a respective PRS generator thereat, the receiver PRS generator being synchronised to the transmitter PRS generator by taking samples from the transmitter PRS and conveying the samples to synchronisation means at the receiver, the samples taken being added with predetermined skew to the data sequence for transmission whereby the time of transmission of the conveyed samples is decoupled from the points in the PRS for which they were selected.

According to a further aspect of the present invention there is provided a method of synchronising a first sequence generator, obeying a generator polynomial whose coefficients and operators are defined over a Galois Field, disposed at a data receiver with a second identical sequence generator disposed at a data transmitter, including the steps of selecting samples from the source sequence produced by the second generator and adding these with predetermined skew to a data stream for transmission from the transmitter to the receiver, which data stream includes a predictable data value at intervals, framing the received data and thus determining the interval and the positions of the predictable data values, and sampling the received data at said positions, the resultant sequence of samples comprising a sampled version of the selected and skewed samples of the sequence produced by the second generator, determining the phase of the second generator from the selected sequence samples and adjusting the phase of the first generator to correspond to that of the second generator, which method serves also for automatically determining at said data receiver whether said data transmitter has applied its sequence generator.

The present application thus relates to an extension of the mechanism of U.S. Pat. No. 5,237,593 in order that synchronisation of the receiver PRS generator may be achieved with the minimum number of source PRS samples taken from the transmitter PRS generator and the minimum number of conveyed channel samples in a transmission channel independent of the constraints on distribution of those conveyed channel samples in that transmission channel. The arrangement may be referred to as a skewed sample scrambler.

Such a mechanism may alternately be employed to provide a specific relationship between the channel samples conveyed through a communication channel so as to improve resilience of the synchronisation circuit to errors in the transmission channel.

In the method of synchronising as referred to in the fifth paragraph of this application the predictable values may constitute a part of a predictable framing sequence. This framing sequence may be used for error detection and correction and is not appreciably affected by said operation. The framing sequence may be chosen such that the possible effect of errors on framing and sequence synchronisation may be performed concurrently. The framing sequence achieves full potential once the sequence is synchronised.

Thus the present application also relates to a further extension of the mechanism of U.S. Pat. No. 5,237,593, the further extension being to the means of conveying samples in which such samples are modulo added to specific digits of a predictable framing sequence (for example a cyclic redundancy check as used in the header of an ATM data cell) such that the effect of channel errors on the integrity of the conveyed channel samples is minimised while retaining the attributes of the predictable framing sequence. When the scrambler is synchronised all digits of the predictable framing sequence may be fully employed for their original purpose. (eg. error detection and correction in the case of a CRC).

A further implication of the development is a modification to the means by which said channel samples are used to synchronise the receiver PRS.

A further option is the application of said method to a transmission system operating with variable size ATM cells in an optimal manner.

Embodiments of the present invention will now be described with reference to the accompanying drawings, in which:

FIGS. 1a and 1b, respectively, illustrate schematically transmitter and receiver apparatus for performing PRBS (pseudo random binary sequence) synchronisation according to the present invention;

FIG. 2a–b illustrates frame format and construction;

This present invention involves an additional step being introduced into the scrambling process illustrated in FIG. 1 of U.S. Pat. No. 5,237,593. This function will be referred to as the sample mapping block and involves the selection and storage of particular samples of the transmitter PRS generator (the source PRS samples), prior to their transmission over the transmission channel as conveyed channel samples. A functionally complementary block is employed in the receiver, to decouple the time of transmission of the conveyed samples from the points in the PRS from which they were selected, so as to enable the optimisation of the performance of the system, for example in terms of time to reach scrambler synchronisation, as will be apparent from the following.

Figure 1A:
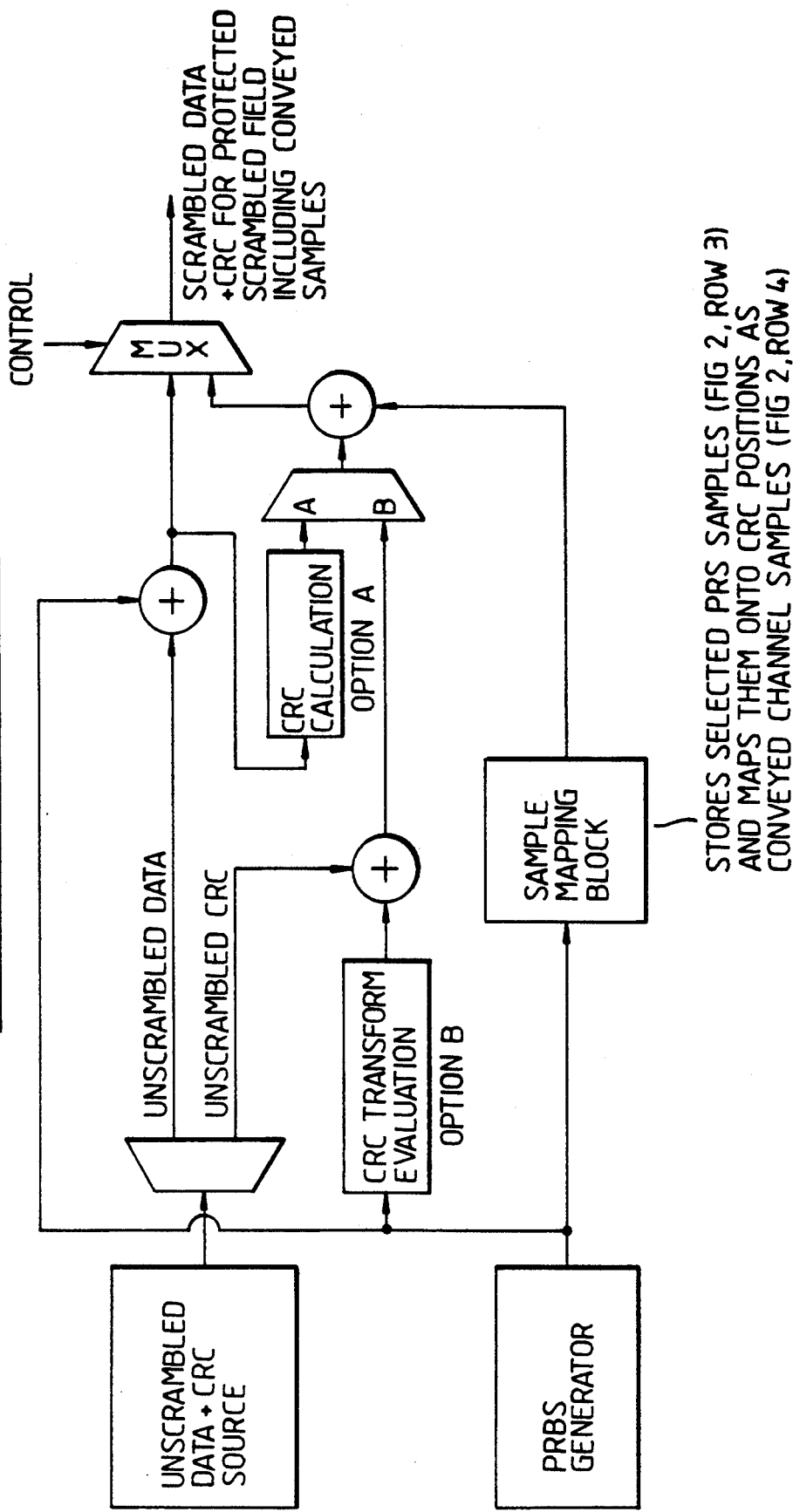
Figure 1B:
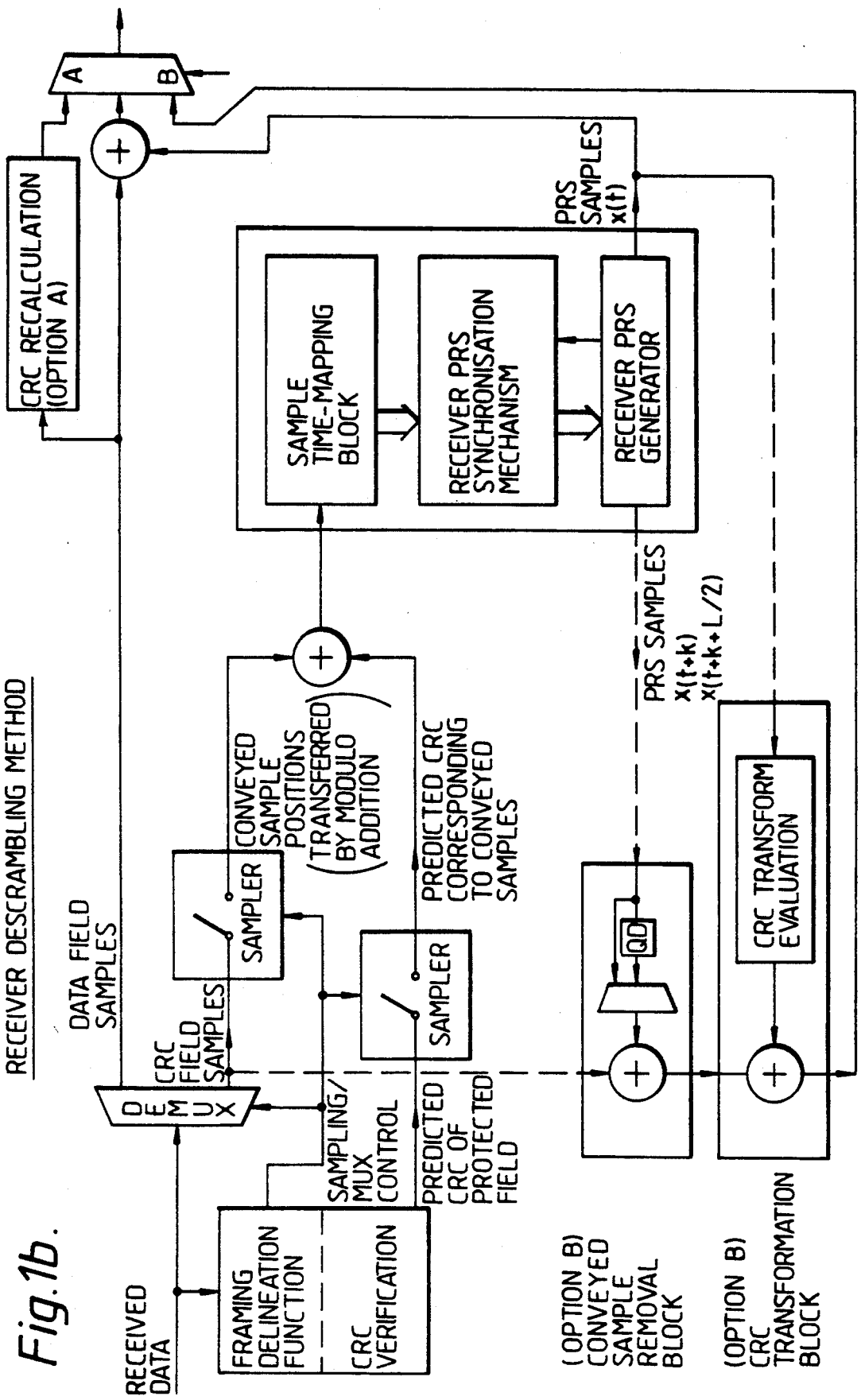

The apparatus required by various embodiments of the present invention is illustrated in FIG. 1a (transmitter) and FIG. 1b (receiver). These figures are considered to be self-explanatory. With regard to the transmitter and the CRC for scrambled data, there are two options for generating the CRC for the protected scrambled field. Option A is straightforward recalculation based on the bits of the protected scrambled field, therefore a CRC corruption existing in the unscrambled domain will be eradicated. Option B is transformation of the CRC field in the unscrambled domain to give the correct CRC in the scrambled domain, thus a CRC corruption in the unscrambled domain will be preserved. In option B, the CRC field samples are modified by adding (modulo-2) the value of the CRC evaluated on the PRS corresponding to the protected field. Either option A or option B may be employed. With regard to the receiver and the CRC for unscrambled data, there are two options for regenerating the CRC on the unscrambled data. Option A is straightforward recalculation based on the protected data field, therefore a CRC corruption occuring in the scrambled domain will be eradicated. Option B is a transformation of the CRC in the scrambled domain to give the correct CRC for the unscrambled domain, thus a CRC corruption in scrambled domain will be preserved. In option B, the CRC field samples must first be passed through the conveyed sample removal block to undo the modulo added conveyed samples available as samples $x_{t+k}$ and $x_{t+k+L/2}$ from the PRS generator. Option B then requires calculation of the CRC transformation field in which the CRC of the PRS corresponding to the protected field of the data is calculated and modulo added to the scrambled CRC field and hence remultiplexed into the data sequence.

To minimise the number of conveyed channel samples necessary to synchronise the receiver PRS (of order F) to the transmitter PRS it is necessary to ensure that at least F source PRS samples are linearly independent. By way of example, one means of achieving this is to sample the transmitter PRS at a fixed and regular interval that is mutually prime with respect to the PBS cycle length. As an example, in a system conveying ATM cells, this can be made to correspond to one sample per ATM cell (e.g. every 424 bits). Where the transmitter pseudo random sequence generator is a linear feed back shift register with maximum length polynomial order F, then F samples will be sufficient to synchronise the receiver using for example the direct method employing the realisation of the mapping matrix quoted at column 5 lines 20 to 32 of patent application No. 5,237,593 or the method of successive sample synchronisation described at column 6 line 13 to 26 of U.S. Pat. No. 5,237,593.

Where there exists the means for conveying more than one sample per ATM cell, then the function of the sample mapping block is to map several (n) source PRS samples chosen to have linear independence onto conveyed channel samples. This improvement enables the time to synchronisation of the receiver scrambler to be minimised independently from the distribution of samples transferred in a repeated pattern within a frame. Thus in this case the transmitter is designed so that n linearly independent samples are selected from the PRS by virtue of each sample being selected at a regular interval mutually prime with respect to the PRS sample length. The n samples are then conveyed through the transmission system, at selected positions in the transmitted data sequence, for example as adjacent elements, to the receiver where their position is located and they are applied to the PRS synchronisation mechanism which is designed with knowledge of their original relative positions and absolute positions in respect of the scrambled data sequence. Given no errors, n linearly independent samples are sufficient to synchronise an nth order PRBS.

Figure 2A:
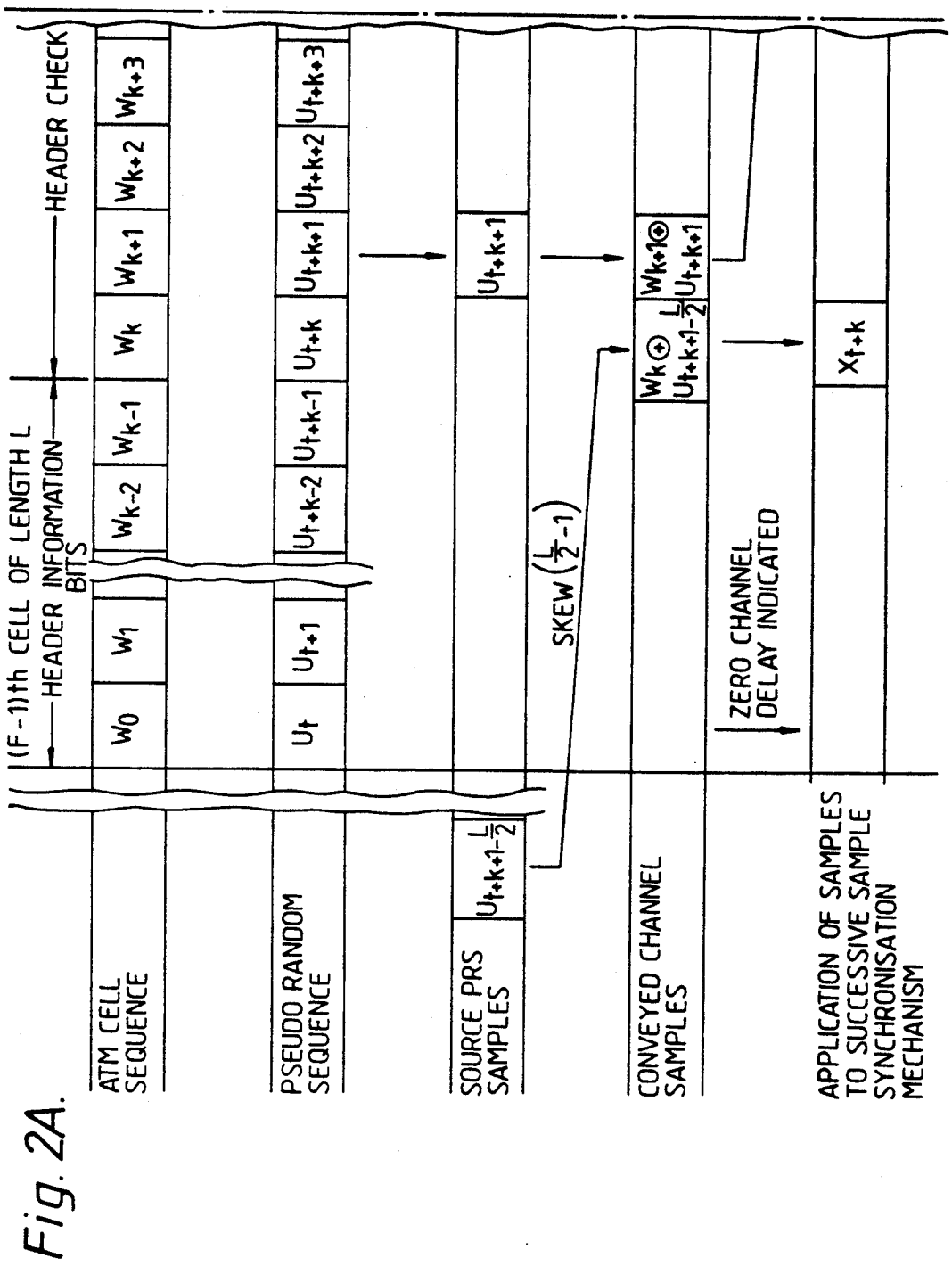
Figure 2B:
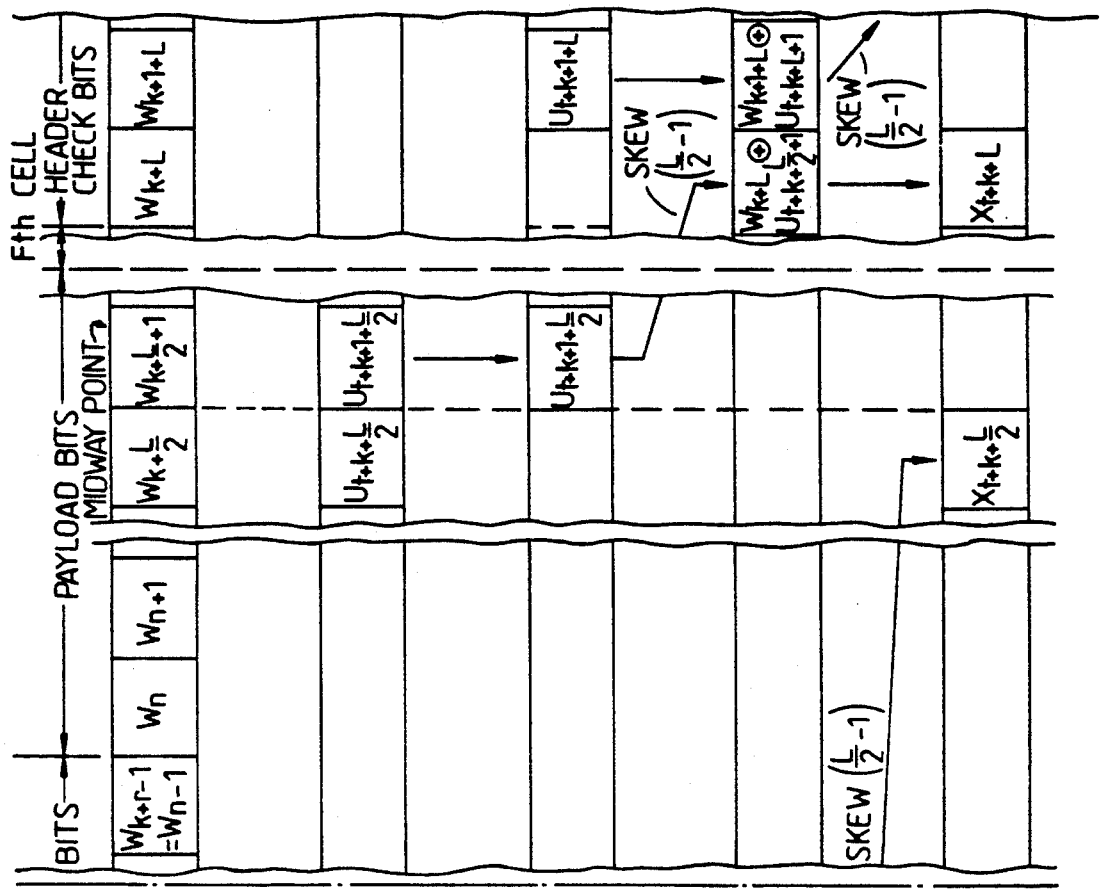

The source PRS samples may for example conveniently be taken at regular intervals (i.e. distributed and e.g. at intervals of half an ATM cell or 212 bits) whereas the conveyed channel samples are grouped together in a particular part of the cell. This positional transformation will then need to be accounted for in synchronisation of the receiver PRS generator. This is illustrated in FIG. 2 of the accompanying drawings in which one sample from the transmitter PRS is taken as that used to scramble the second CRC bit of the header and the second sample is that used to scramble the bit at the point midway between consecutive 2nd CRC bits, which are referred to as the midway points. The conveyed channel samples are conveyed in positions in the channel which have predictable value. As an example the midway point sample is stored in a register, until the first following header, by the sample mapping block and then modulo added to the first CRC bit header (1st bit of the 5th byte), the sample corresponding to the 2nd CRC header bit is modulo added to the second CRC bit. In this scheme having similarity with that described in the aforementioned application, the header CRC bits are first calculated ideally on the scrambled header bits. The bits to which the conveyed channel samples are applied are selected to be those least effected by the effect of errors in the header, and additionally, the samples selected are those for which a single error in the header will not modify the prediction of the bit without other detectable bits so that single errors in the header may either be detected to avoid false assertion of scrambler synchronisation or may be more fully accounted for by exploiting the inherent properties of the shortened cyclic code to correct single errors so that in this event synchronisation time will not be unduly increased.

A modified scheme is to convey samples of the transmitter PRS more than once, for example each sample is convey as the second sample in one ATM cell header CRC and as the first sample in the following ATM cell header CRC, these samples are only used by the receiver PRS synchronisation mechanism if they are in agreement, so that in an error prone transmission system (in which n linearly independent samples would without error be sufficient to synchronise an nth order PRBS) confidence of scrambler synchronisation following acquisition would be enhanced such that a scrambler synchronisation verification phase may be reduced or eliminated.

At the receiver, addition of the s source PRS samples (for example s=2), has the consequence of reducing the size of the field upon which cell delineation can be performed. This results in the probability of statistical emulation of the CRC check being increased by a factor $2^s$. Thus where a k bit CRC (k=8) is available for delineation, $x_1$ consecutive CRC syndromes are need to achieve satisfactory delineation giving a probability of false delineation due to statistical emulation of the CRC at a level of $$P_1 = (b-1)(1/(2^k))^{x_1}$$

where b is the number of bits in the cell.

If k is reduced by s the number of conveyed channel samples per cell, then the number of cells needed to give the same degree of confidence in cell delineation $x_2$ will be greater to ensure that the probability $P_1$ remains as in the equation above $$P_1 = (b-1)(1/(2^{k-s}))^{x_2}$$

In the initial phase, scrambler synchronisation is commenced in parallel with the cell delineation process. The first of the two sample bits corresponds to the source PRS sample taken from the midway point of the previous cell. This may be used to drive convergence of the successive sample synchronisation circuit as follows: The conveyed sample bit is compared to the corresponding receiver sample value (stored in a register from the time corresponding to the midway point of the previously received cell). If this agrees with the predicted value, then no action is taken. If this is different from the predicted value then feedforward taps are applied according to the same principles as established in FIG. 6 of U.S. Pat. No. 5,237,593. The feedforward coefficients of the recursive filter are selected so that the receiver PRS generator automatically converges to synchronism half a cell ahead of the value as determined by the most recently applied conveyed channel sample. This correctly accounts for the delay between the sample being taken from the transmitter PRS and it being applied in the receiver.

The next sample available, corresponding to that taken from the 2nd bit of the header CRC of the cell currently being received is stored in a register until the midway point of the cell and is then used in the way described above, being compared with the prediction of the scrambler state stored at the first bit of the header.

This mechanism continues, verification of the scrambler being indicated by consecutive agreement between the predicted sample bits and the conveyed sample bits.

Advancing the successive sample synchronisation automatically by z positions requires that the feedforward taps for synchronisation with no advance is multiplied by the sequence generator matrix raised to the power z. In other words, a system is provided in which linearly independent samples are taken regularly from the transmitter PRS and stored by the transmitter sample mapping block thereat before being conveyed in a group to the receiver, where they are stored by the receiver sample mapping block until being injected into the receiver PRS synchronisation mechanism at the same interval as originally sampled. The delay z resulting from the sample mapping in both transmitter and receiver is taken account of by modifying the coefficients of the descrambler resynchronisation mechanism, to generate the current PRS plane, which will be ahead of the conveyed samples by the amount of the delay. This is achieved by multiplying the resynchronisation mechanism matrix operator by the sequence generator matrix raised to the power z.

Where consecutive cells have varying length (e.g. short cells of 18 bytes and long cells of 54 bytes as described in U.S. Pat. No. 5,237,593 then, by way of examples, one method by which the skewed sample scrambler can be applied is as follows.

In this case one element in the header is dedicated as the conveyed channel sample and is combined by modulo addition with a predictable cell length indication (either short (S) or long (L) where S is a factor of L). The source PRS samples conveyed are only those which correspond to the first source PRS sample of one of the L/S possible positions for the cell (arbitrarily selected). The conveyed channel sample selects the latest available source PRS sample. Thus for example, where entirely short cells are being transmitted and L/S=3 the same source PRS sample is conveyed three times. In other words, selected samples of the transmitter PRS are conveyed one or more times in a period T to a receiver scrambler synchronisation mechanism which only uses one sample per period T, T corresponding to a long cell in a system combining short and long cells in an arbitrary sequence, the number of bytes in a short cell being an integer submultiple of the number if a long cell.

The receiver must reconstruct the source PRS samples firstly by locating conveyed channel samples. Conveyed channel samples may be located by cell delineation based on the CRC alone including the length estimation. The determination of the sources PRS sample location in respect of the three options (in this example) can, where L/S=3, be deduced from when changes in the conveyed sample bit occur.

Synchronisation of the PRS generator in the receiver may in this example conveniently use the successive bit synchronisation circuit chosen to generate a sequence 1 cell in advance of the conveyed sample bits, whose use is deferred by up to 1 cell.

Figure 3:
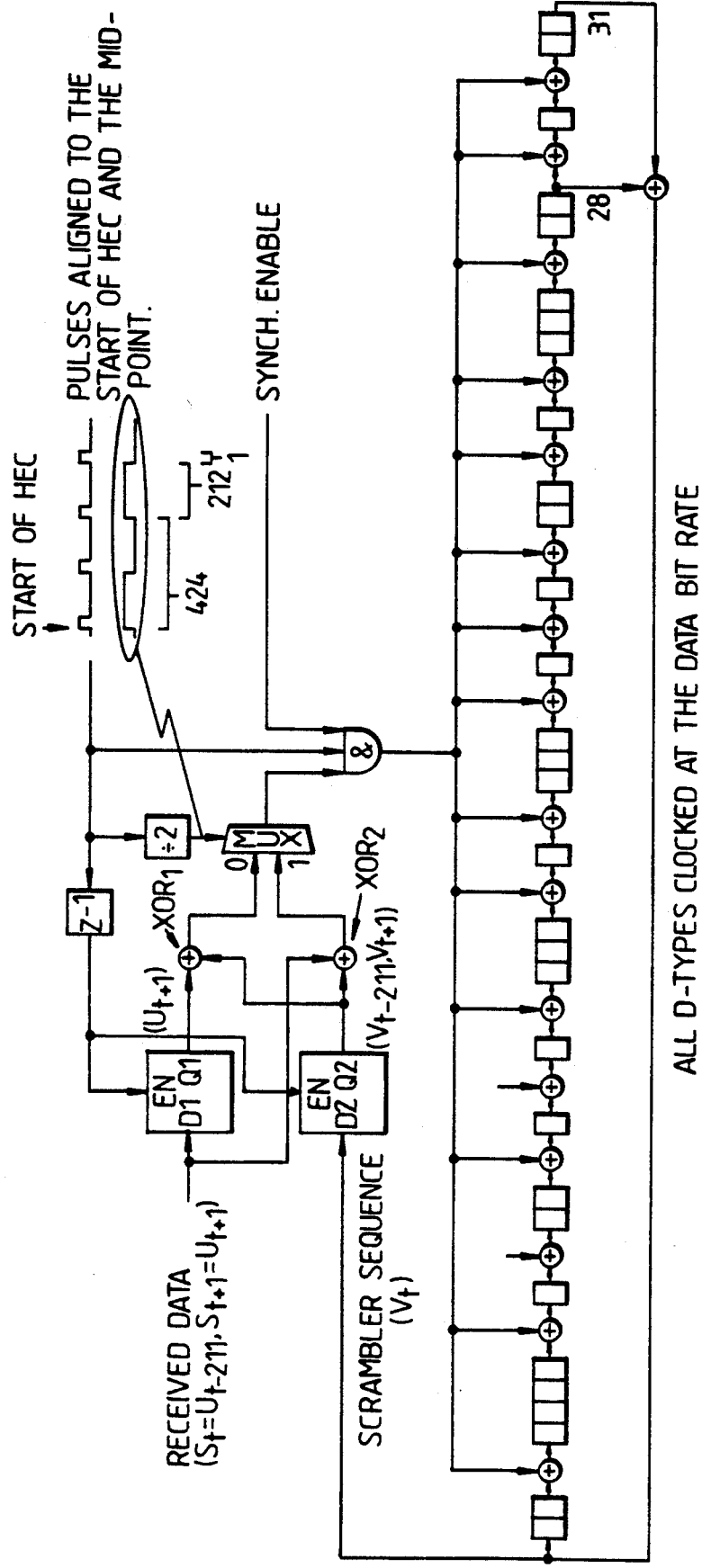
FIG. 3 illustrates an element of the receiver in greater detail.

FIG. 3 shows an implementation for elements of the receiver (the sample-time mapping block, the receiver PRBS synchronisation mechanism and receiver PRS generator within the box of FIG. 1b) for the method of the present invention, these elements forming a 31st order recursive descrambler.

In FIG. 3:
 the received data $S_t$ is that conveyed with the first CRC bit (applied at time $x_{t+k}$ in FIG. 2) comprising PRBS sample $U_{t+k+1-L/2}$ (or more simply $U_{t-211}$);
 the received data $S_{t+1}$ is that conveyed with the second CRC bit (applied at time $x_{t+k+L/2}$ in FIG. 2) comprising PRBS sample $U_{t+k+1}$ (or more simply $U_{t+1}$);
 the feed forward taps of the PRBS are held low (inactive) except at the time of application of the conveyed samples at the time of the first CRC sample ($x_{t+k}$ in FIG. 2) and midway to the next (first) CRC sample ($x_{t+k+212}$). They may also be made permanently inactive by the synch enable input being held low as required by the state machine description, see hereinafter.
 At time t:

the receiver PRBS generator sample $V_t$ is at the input to the lower D-type D2;

the source PRBS sample $S_t = U_{t-211}$ is at the input D1;

the sample previously stored at the output of $D2 = V_{t-211}$;

the $XOR2 = U_{t-211} + V_{t-}$, this output being selected by the multiplexer and applied to the feed foward taps of the recursive descrambler.

At time t+1:

the receiver sample $V_{t+1}$ is at the input to D2;

the sample $S_{t+1} = U_{t+1}$ is at the input to D1;

these values are latched on the following clock edge such that $EXOR1 = V_{t+1} + U_{t+1}$.

At time t+2 through to time t+211:

no changes take place, other than generation of the PRBS.

At time t+212:

EXOR1 output $V_{t+1} + U_{t+1}$ is applied via MUX to the feed forward taps.

At time t+213:

$D2 + V_{t+213} = V_{t-211+L}$ (to be held as the prediction for the following conveyed bit).

The cycle repeats for each cell received in accordance with the state machine described hereinafter.

In a data transmission system in which skewed PRS samples are conveyed by means of their modulo summation to selected bits of a CRC field occurring regularly, such as for an HEC (Header Error Control) field of an ATM cell, and the conveyed bits are recovered at the receiver as the result of modulo subtraction of the predicted CRC value of those received with superimposed conveyed samples, frame or cell delineation making use of the CRC field during acquisition of synchronisation is restricted to those bits not employed for conveyed samples. Following acquisition of synchronisation, verification of scrambler synchronisation, which is necessary in a potentially error prone transmission system, is achieved by comparison of predicted PRS values to conveyed samples for n samples, the confidence level increasing with n. The CRC samples are returned to their intended use once the steady state is reached following acquisition and verification of the receiver PRS phase.

Figure 4:
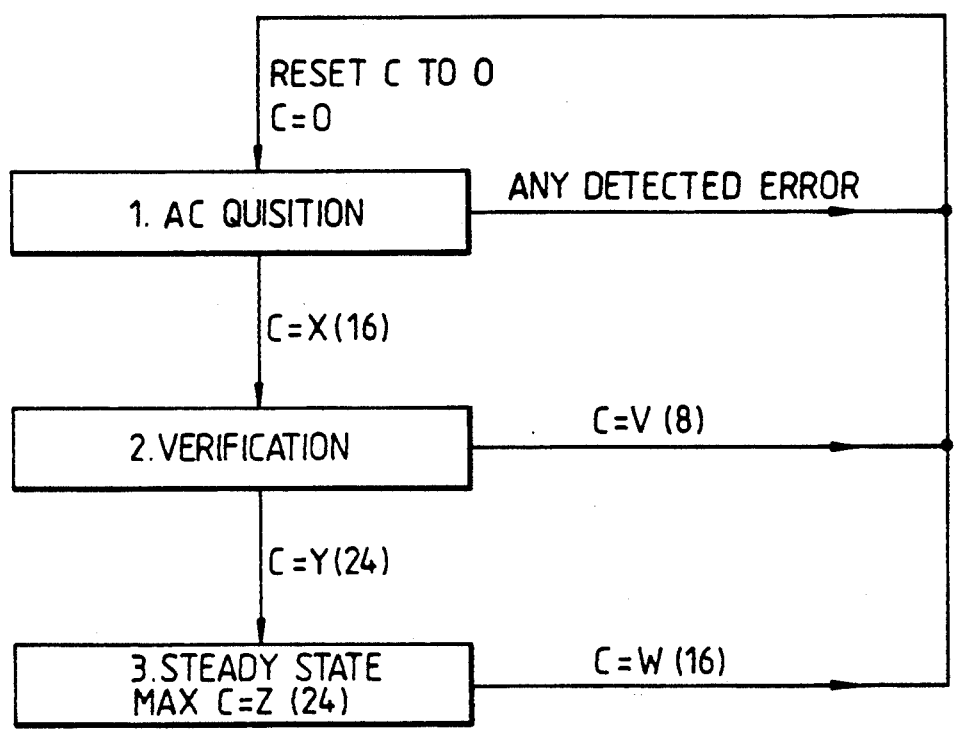
FIG. 4 illustrates a state machine.

The three states of the scrambler are acquisition, verification and steady state as indicated in FIG. 4 which illustrates a State Machine. The state machine is based on a simple up down counter whereby the counter value (C) represents the degree of confidence to which the scrambler is in synchronisation. This confidence counter value is used to determine whether the state machine is in the acquisition state, the verification state or the steady state. The confidence counter value is incremented or decremented depending on the result of a test conducted on every received cell which establishes whether samples sent from the remote transmitter scrambler are correcty predicted by the local receiver scrambler.

It is desirable that, in the rare event of a bit slip between the source scrambler and the receiver scrambler following a physical circuit malfunction, the time for the state machine to the acquisition state from the steady state is minimised consistent with robust performance. To make the state machine return rapidly to the acquisition state the indicated decision criteria were chosen, these favouring decrementing the confidence counter.

In the case of an 8 bit CRC, where two bits are used to convey PRBS samples (by modulo addition) and six remain unaltered, the criteria for counter adjustment is as described below.

In the initial state the confidence counter (C) value is zero. In state 1, i.e. acquisition, the confidence counter has a range O to X−1. For every cell correctly received with no errors detected in CRC bits 1 to 6 the confidence counter is incremented by one and the two conveyed bits used to drive the descrambler into synchronisation. Any error detected in the cell header results in a return to the initial state, the confidence counter being reset at zero. Transition to the verification state occurs when the counter reaches X, a possible value of X being 16 as indicated. In state 2 i.e. verification, the confidence counter has the range X to Y−1. For every cell received without detected errors, the two conveyed bits are compared with their predicted values. For each cell with two correct predictions received, the confidence counter is incremented. If one or two incorrect predictions are made, then the counter is decremented. If the counter falls below V, a possible value being 8 as indicated, the system returns to the acquisition initial state 1 and the confidence counter is reset. Transition to the steady state (State 3) occurs when the counter reaches Y, a possible value being 24 as indicated. In state 3 the confidence counter has range Y to Z. The rules for incrementing and decrementing the confidence counter are as for state 2. The acquisition state is returned to automatically should the counter drop below W, a possible value being 16 as indicated. It will be noted that the confidence counter has an upper limit of Z, possibly 24 as indicated.

The conditions for incrementing and decrementing the confidence counter (C) and the state definitions and degree of hysteresis in their definitions may be modified to suit the number of conveyed samples and the probability of their being errored.

We claim:

1. Apparatus for transmitting a data sequence from a transmitter to a receiver, including means at the transmitter for scrambling the data sequence by modulo addition thereto of a pseudo random sequence (PRS) output from a PRS generator at the transmitter, and means at the receiver for unscrambling the received scrambled data sequence by modulo subtraction therefrom of the same PRS, the PRS at the receiver being generated by a respective PRS generator threat, the receiver PRS generator being synchronised to the transmitter PRS generator by means of samples taken from the transmitter PRS and conveyed to synchronisation means at the receiver, and wherein the transmitter includes a PRS sample mapping block and the receiver includes a functionally complementary sample mapping block and the time of transmission of the conveyed samples is decoupled from the points in the PRS for which they were selected, the conveyed samples being skewed with respect to the PRS, and wherein the transmitter sample mapping block is such that a plurality of linearly independent samples are selected from the PRS, each sample being selected at a regular interval mutually prime with respect to the PRS cycle length.

2. Apparatus as claimed in claim 1 wherein the plurality of samples are conveyed to the receiver at selected positions in the transmitted data sequence and wherein at the receiver their position is located and they are applied to the receiver synchronisation means, said synchronisation means having knowledge of their original relative positions and absolute positions in respect of the scrambled data sequence.

3. Apparatus as claimed in claim 1 wherein the PRS is an nth order pseudo random binary sequence (PRBS).

4. Apparatus as claimed in claim 1 wherein the linearly independent samples taken regularly from the transmitter PRS are stored by the transmitter sample mapping block and conveyed in a group to the receiver where they are stored in the receiver sample mapping block and including means for injecting the receiver stored samples into the receiver synchronisation means at the same interval as they were sampled.

5. Apparatus as claimed in claim 4 wherein a delay of an integral number (Z) of positions resulting from the sample mapping in both the transmitter and the receiver is taken into account by modifying the coefficients of a receiver PRS resynchronisation mechanism to generate the current PRS phase, which will be ahead of the conveyed samples by the amount of the delay, by means serving to multiply a PRS mechanism matrix operator by the sequence generator matrix raised to the power Z.

6. Apparatus as claimed in claim 1 including means whereby the skewed PRS samples are conveyed by modulo addition to selected bits of a cyclic redundancy check (CRC) field occuring regularly in the data sequence, and means whereby the conveyed bits are recovered at the receiver as a result of modulo subtraction of predicted CRC values from those received, and wherein frame or cell delineation making use of the CRC field during acquisition of synchronisation is restricted to bits not employed for conveying PRS samples.

7. Apparatus as claimed in claim 6 and including means whereby, following acquisition of synchronisation, verification of the receiver PRS scrambler sequence synchronisation with the transmitter PRS can be achieved, said means comparing predicted PRS values and the conveyed sample values for n samples, the confidence level increasing with n, the CRC samples being returned to their intended use of error detection or correction, frame or cell delineation once a steady state is reached following acquisition and verification.

8. Apparatus as claimed in claim 6, wherein the CRC field is a header error control (HEC) field of an asynchronous transfer mode (ATM) cell.

9. Apparatus as claimed in claim 1 wherein selected samples of the transmitter PRS are conveyed one or more times in a period T to a receiver unscrambling mechanism which uses only one sample per period T, T corresponding to a long cell in a system combining short and long cells in an arbitrary sequence where the number of bytes in a short cell is an integer submultiple of the number in a long cell.

10. Apparatus as claimed in claim 1 in which samples taken from the transmitter PRS are each conveyed more than once, these samples only being used by a receiver PRS synchronisation mechanism if they are identical.

11. A method of transmitting a data sequence from a transmitter to a receiver including the steps of scrambling the data sequence by modulo addition thereto of a pseudo random sequence (PRS) output from a PRS generator at the transmitter, and unscrambling the received scrambled data sequence at the receiver by modulo subtraction therefrom of the same PRS, the PRS at the receiver being generated by a respective PRS generator thereat, the receiver PRS generator being synchronised to the transmitter PRS generator by taking samples from the transmitter PRS and conveying the samples to synchronisation means at the receiver, the samples taken being added with predetermined skew to the data sequence for transmission whereby the time of transmission of the conveyed samples is decoupled from the points in the PRS for which they were selected, and wherein a plurality of linearly independent samples are selected from the transmitter PRS, each sample being selected at a regular interval mutually prime with respect to the PRS cycle length.

12. A method as claimed in claim 12 wherein the plurality of samples are conveyed to the receiver at selected positions in the transmitted data sequence and wherein at the receiver their position is located and they are applied to receiver synchronisation means, said synchronisation means having knowledge of their original relative positions and absolute positions in respect of the scrambled data sequence.

13. A method as claimed in claim 12 wherein the linearly independent samples taken regularly from the transmitter PRS are stored by a transmitter sample mapping block and conveyed in a group to the receiver where they are stored in a receiver sample mapping block before injection into the receiver synchronisation mechanism at the same interval as they were sampled.

14. A method as claimed in claim 13 wherein a delay of an integral number (Z) of positions resulting from the sample mapping at both the transmitter and receiver is taken into account by modifying the coefficients of a receiver unscrambling resynchronisation mechanism to generate the current PRS phase, which will be ahead of the conveyed samples by the amount of the delay, by multiplying a resynchronisation mechanism matrix operator by a sequence generator matrix raised to the power Z.

* * * * *